US012350797B2

(12) United States Patent
Zhang

(10) Patent No.: US 12,350,797 B2
(45) Date of Patent: Jul. 8, 2025

(54) PNEUMATIC NAILING GUN WITH ADJUSTABLE NAILING FORCE

(71) Applicant: Huading Zhang, Taizhou (CN)

(72) Inventor: Huading Zhang, Taizhou (CN)

( * ) Notice: Subject to any disclaimer, the term of this patent is extended or adjusted under 35 U.S.C. 154(b) by 61 days.

(21) Appl. No.: 18/363,721

(22) Filed: Aug. 1, 2023

(65) Prior Publication Data

US 2023/0373070 A1 Nov. 23, 2023

Related U.S. Application Data

(63) Continuation of application No. PCT/CN2022/072211, filed on Jan. 17, 2022.

(30) Foreign Application Priority Data

Feb. 2, 2021 (CN) ......................... 202110143489.8
Sep. 15, 2021 (CN) ......................... 202122238613.7

(51) Int. Cl.
*B25C 1/04* (2006.01)

(52) U.S. Cl.
CPC .............. *B25C 1/043* (2013.01); *B25C 1/047* (2013.01)

(58) Field of Classification Search
CPC ....................................................... B25C 1/04
See application file for complete search history.

(56) References Cited

U.S. PATENT DOCUMENTS

2024/0300080 A1* 9/2024 Ying ......................... B25C 5/00

* cited by examiner

*Primary Examiner* — Praachi M Pathak
(74) *Attorney, Agent, or Firm* — Westbridge IP LLC

(57) ABSTRACT

Disclosed is a pneumatic nailing gun with an adjustable nailing force, which solves the technical problem that a nailing force adjusting precision of an existing pneumatic nailing gun cannot be kept for a long time. The pneumatic nailing gun comprises a housing and a striking pin, a first cylinder and a second cylinder are further arranged in the housing, and the first air chamber and the second air chamber are communicated with each other through a fully-closed ventilation channel, so that the first air chamber, the ventilation channel and the second air chamber form a pneumatic structure closed relative to the outside, and an air hole capable of keeping the pneumatic structure in communication with the outside is arranged in the pneumatic structure, and a handle capable of adjusting a ventilation capacity between the air hole and the outside is arranged on the housing.

15 Claims, 15 Drawing Sheets

PNEUMATIC NAILING GUN WITH ADJUSTABLE NAILING FORCE

CROSS-REFERENCE TO RELATED APPLICATIONS

This application is a continuation of International Application No. PCT/CN2022/072211, filed on Jan. 17, 2022, which claims priority to Chinese Patent Application No. CN202110143489.8, filed on Feb. 2, 2021 and Chinese Patent Application No. CN202122238613.7, filed on Sep. 15, 2021. All of the aforementioned applications are incorporated herein by reference in their entireties.

TECHNICAL FIELD

The present application belongs to the technical field of machinery, and relates to a pneumatic nailing gun, and particularly to a pneumatic nailing gun with an adjustable nailing force.

BACKGROUND

A pneumatic nailing gun is a tool driven by high pressure air to realize nailing. Existing pneumatic nailing guns are divided into a single air cylinder nailing gun and a double air cylinder nailing gun. The single air cylinder nailing gun is mainly driven by an external high pressure air source to realize nailing, wherein the external high pressure air is generally high pressure air output by a high pressure air tank or a compressor. Therefore, the single air cylinder pneumatic nailing gun needs to be connected to the high pressure air source through an air pipe, and can only move to use around the high pressure gas source. The double air cylinder nailing gun produces high pressure air by adding one air cylinder based on the single air cylinder and is driven by arranging a built-in power source. Therefore, the double air cylinder nailing gun is a portable nailing gun, and may move in any range.

The nailing force adjustment of the single air cylinder pneumatic nailing gun refers to adjusting a pressure input into the single air cylinder by arranging a balance valve on an air path between the single air cylinder and the external high pressure air source, which is mainly performed in an internal air path isolated from the outside, without leaking the high pressure air source to the outside.

The nailing force adjustment of the double air cylinder nailing gun mainly refers to spring force adjustment and sensor program control adjustment. According to a structure of the spring force adjustment, such as a nailing gun disclosed by the Chinese patent, the nailing gun is provided with a spring and an adjusting knob at a piston fixedly connected to a striking pin, when the piston is contracted, the spring is compressed to exert an acting force of the spring on the piston, and the adjusting knob is capable of adjusting an initial position of the spring to change the acting force of the spring, and when the piston is released, different acting forces of the spring can produce different nailing forces.

According to the sensor program control adjustment, a preset nailing position is set through several sensors, when the piston of the air cylinder with a high pressure generated by the compressed air reaches the preset position, it is sensed by the sensors and the nailing is performed by program control, or an initial position and a stroke are sensed by the sensors to calculate a nailing position and the nailing is performed by program control.

The above ways to adjust the nailing force are all very effective, but long-term precision cannot be kept in the adjustment of nailing force precision. Whether the spring or the sensor is used for a long time, the precision will be reduced gradually, thus being difficult to keep the long-term precision.

SUMMARY

In view of the above problems in the prior art, the present application provides a pneumatic nailing gun with an adjustable nailing force, and the technical problem to be solved is how to precisely adjust the nailing force for a long time.

The present application is realized by the following technical solution. A pneumatic nailing gun with an adjustable nailing force comprises a housing, a striking pin arranged in the housing and capable of reciprocating to nail, a first cylinder and a second cylinder arranged in the housing, a first piston arranged in the first cylinder and defining a first air chamber with the first cylinder for storing air in the first cylinder, the first piston driven by a motor to reciprocate linearly to perform a compression stroke and a return stroke, a second piston arranged in the second cylinder and capable of reciprocating between a first position and a second position, the second piston defining a second air chamber with the second cylinder, and the striking pin fixedly connected to the second piston, characterized in that, the first air chamber and the second air chamber communicated with each other through a ventilation channel, so that the first air chamber, the ventilation channel and the second air chamber form a pneumatic structure closed relative to the outside, an air hole arranged in the pneumatic structure and capable of keeping the pneumatic structure in communication with the outside, a handle arranged on the housing and capable of adjusting a ventilation capacity between the air hole and the outside, wherein when the second piston is located in the first position and the striking pin is locked, the first piston performs the compression stroke to compress air in the first air chamber, and a part of the compressed air is discharged to the outside through the air hole, and wherein when the second piston is located in the second position and the striking pin is unlocked, the first piston performs the return stroke to make the second piston return to the first position to be locked, and a part of external air is sucked into the pneumatic structure through the air hole.

A working principle of the pneumatic nailing machine is as follows: the first air chamber, the ventilation channel and the second air chamber form the pneumatic structure, and during nailing, the air hole in the pneumatic structure keeps the determined ventilation capacity with the outside when the handle is adjusted in advance, and the piston is contracted at a bottom portion of the second cylinder when the second piston is located in the first position; because the striking pin is locked by the locking member and the striking pin is fixedly connected with the second piston, the second piston is confined to the bottom portion of the second cylinder and cannot move, a volume of the second air chamber is fixed, and the first piston performs the compression stroke, so that air in the first cylinder is compressed to produce high pressure air, thus forming a high pressure state in the whole pneumatic structure; because the air hole is kept in communication with the outside, a part of the high pressure air is discharged from the pneumatic mechanism, so that a pressure value of actual high pressure air is smaller than a pressure value produced by a predetermined stroke of the first piston; the handle is located in different positions by operating the handle in advance to adjust the pressure value of the actual high pressure air in the first air chamber, so as to adjust the nailing force, and after the first piston completes the compression stroke, the locking member is unlocked, the second piston moves at a high speed under an action of the high pressure air to drive the striking pin to nail, and then the first piston performs the return stroke; because the pneumatic structure formed by the first air chamber, the ventilation channel and the second air chamber is closed except the air hole, the first air chamber produces a negative pressure relative to the second air chamber during the return stroke, the second piston in the second cylinder is pulled back to the first position and locked by the locking member, the air hole is kept in communication with the outside during the return process, and a pressure of the first air chamber is also lower than an atmospheric pressure, so that the first air chamber is filled with a part of air in advance, and air needed by the first air chamber is replenished in advance. Because only a certain amount of external atmosphere enters the first air chamber after the air hole is matched with the handle, it is insufficient to affect the negative pressure produced by the first air chamber relative to the second air chamber, and a gradually increased torque of the motor can be smoothed when the first piston returns, so that the motor runs steadily and the motor keeps running precisely; and moreover, because the air hole is a static ventilation structure and does not move dynamically like the spring, the precision of adjustment can be kept for a long time.

In the above pneumatic nailing gun, the second cylinder is coaxially located outside the first cylinder in parallel, a cylinder body end portion of the first cylinder and a cylinder body end portion of the second cylinder are provided with an air cylinder end cover capable of sealing with a cylinder body of the first cylinder and a cylinder body of the second cylinder, so as to form the first air chamber and the second air chamber located on the same side, the above ventilation channel is located in the air cylinder end cover, the above air hole is arranged in the air cylinder end cover or the cylinder body of the first cylinder or the cylinder body of the second cylinder, and the air hole is communicated with the ventilation channel or communicated with the first air chamber or the second air chamber.

In the above pneumatic nailing gun, a single air hole is provided, with an aperture of 0.5 mm to 5 mm, or a plurality of air holes are provided. A total ventilation capacity of the plurality of air holes is the same as that of the single air hole with the aperture of 0.5 mm to 5 mm.

In the above pneumatic nailing gun, the handle comprises a threaded rod, the threaded rod is connected with the air cylinder end cover through a thread, an end portion of the threaded rod is provided with a blocking end, and the blocking end is capable of being located in different positions in the air hole after adjusting the handle, thus changing an air output of the air hole.

In the above pneumatic nailing gun, the handle comprises a swinging rod hinged on the housing, an end portion of the swinging rod is provided with a shielding plate, and the shielding plate is capable of shielding a part of air hole after adjusting the handle, thus changing an air output of the air hole.

In the above pneumatic nailing gun, the handle comprises a turntable connected to an outer end of the threaded rod, a steel ball for positioning and a spring acting on the steel ball are further arranged on an edge of the turntable, a plurality of positioning holes uniformly distributed in a circumferential direction are arranged on an outer side surface of the air cylinder end cover, and the steel ball abuts in a hole opening of one of positioning holes under an action of the spring. When rotating the turntable, the turntable rotates with an axial direction of the threaded rod as a center of circle, and because the steel ball abuts in one hole opening under an action of the spring, during rotation, the steel ball may be separated from the original hole opening to enter the next hole opening along a track and make an impact sound to prompt a user to rotate the turntable to the next adjustment position to be positioned.

In the above pneumatic nailing gun, a cylindrical mounting seat is arranged on the air cylinder end cover, a threaded hole is arranged in one end of the mounting seat, the above air hole is arranged in the other end of the mounting seat and a ventilation hole is arranged in the other end of the mounting seat, the threaded rod of the handle is connected in the threaded hole through a thread, an inner end of the threaded rod extends to the hole opening of the air hole and is located between the air hole and the ventilation hole, a lower half portion of the air cylinder end cover is further provided with an air path communicated with the air hole, and the air path is communicated with the outside. Air discharge and intake with the outside are realized by this structure, and this structure can also play a role in dust prevention.

In the above pneumatic nailing gun, the mounting seat is fixedly connected to the air cylinder end cover, the air hole is arranged in the mounting seat, a ventilation hole communicated with the air hole is further arranged in the mounting seat, the ventilation hole is capable of keeping in communication with the outside, the air hole is movably connected with a ventilation column, the ventilation column comprises a ventilation rod, the ventilation rod comprises a ventilation hole and an inner air hole communicated with the ventilation hole, the ventilation hole is communicated with the first air chamber, the ventilation column is connected with the handle, and under the adjustment of the handle, the inner air hole moves in the air hole, and an inner peripheral surface of the air hole and the ventilation hole form a conducting or closing state through the inner air hole. The ventilation capacity of the pneumatic structure with the outside starts to be changed when the handle is rotated for a certain number of turns to form a partially conducting state between an inner peripheral surface of a through hole and an outer air hole, thus avoiding the situation that when an operator touches the handle unintentionally, the handle rotates change the position of the blocking portion, so that the pneumatic structure is communicated with the outside; and meanwhile, the ventilation rod is located in the through hole of the mounting seat, so that a sealing performance in the mounting seat is ensured, and the adjustment precision of the nailing force of the nailing gun is improved.

In the above pneumatic nailing gun, the air cylinder end cover comprises an inner end cover and an outer end cover, the outer end cover is attached to an outer side surface of the inner end cover to form the above ventilation channel between the inner end cover and the outer end cover, and the air path is arranged below the ventilation channel. The external air can enter the first air chamber from a lower side of the first cylinder upwards by this structure, so that the entered air is kept clean.

In the above pneumatic nailing gun, the air path comprises a cylindrical fixed seat arranged on an outer side surface of the inner end cover, the above mounting seat is inserted in the fixed seat and sealed with the fixed seat, a ventilation groove communicated with the above ventilation hole is arranged on the fixed seat, a plurality of ribs are arranged outside the fixed seat on the outer side surface of the inner end cover, a concave cavity is formed between the ribs, a pore communicated with the outside is arranged at an outer edge of the inner end cover, and the ventilation groove, the concave cavity and the pore are communicated with each other. By arranging the concave cavity with a large volume between the ventilation groove and the pore, the high pressure air discharged from the first air chamber can form a buffer and reduce noise.

In the above pneumatic nailing gun, an inner side surface of the inner end cover is provided with a first convex portion inserted and hermetically connected in the cylinder body of the first cylinder and a second convex portion inserted and hermetically connected in the cylinder body of the second sir cylinder respectively, a first through hole penetrating through the inner end cover is arranged in the first convex portion, a second through hole penetrating through the inner end cover is arranged in the second convex portion, a sealing ring is arranged between the outer end cover and the inner end cover, the sealing ring encloses the first through hole and the second through hole in the sealing ring, and a groove communicating the first through hole with the second through hole is arranged on the outer end cover.

In the above pneumatic nailing gun, the mounting seat comprises a ventilation ring communicated with the air hole, the ventilation hole is formed in the ventilation ring, the ventilation column comprises a screw, the mounting seat further comprises a threaded hole, the screw is mounted in the threaded hole through a thread, the ventilation column is connected with the handle through a boss, the ventilation column moves in the air hole through relative rotation of the screw and the threaded hole, and the air hole forms a conducting or closing state with the ventilation ring through the inner air hole.

In the above pneumatic nailing gun, an end portion of the mounting seat is provided with a flange, the fixed seat comprises a mounting groove matched with the flange in shape, the flange is located in the mounting groove, an annular groove is further formed on an outer wall of the mounting seat, and the annular groove is communicated with the ventilation groove.

In the above pneumatic nailing gun, the nailing gun further comprises an outer housing, a fixed groove is arranged on the outer housing, a cover plate is mounted on a groove opening of the fixed groove, a movable rod is arranged in the fixed groove, one end of the movable rod is provided with a spring groove for mounting a second spring, the second spring abuts against the air cylinder end cover, the other end of the movable rod is a spherical boss, the handle comprises a connecting rod and a boss turntable connected to an outer end of the connecting rod, the connecting rod is connected with the boss, a spherical groove matched with the spherical boss in shape is formed on the boss turntable, and the spherical boss passes through a U-shaped opening of the fixed groove and abuts against the spherical groove.

In the above pneumatic nailing gun, a rotating groove with an opening is further arranged on the outer housing, the boss turntable rotates in the rotating groove, numbers corresponding to the spherical groove are further arranged on an end surface of the boss turntable, and the numbers are arranged on a touch table of the boss turntable at intervals.

Compared with the prior art, the pneumatic nailing gun has the following advantages.

1. According to the pneumatic nailing gun, one air hole communicated with the outside is arranged in the pneumatic structure to adjust the nailing force, so that the nailing force can be adjusted, and a gradually increased torque of the motor can be smoothed when the first piston returns, so that the motor runs steadily and the motor keeps running precisely; and moreover, because the air hole is a static ventilation structure and does not move dynamically like the spring, the precision of adjustment can be kept for a long time.
2. According to the pneumatic nailing gun, when air is discharged and replenished through the air hole, the outer side of the air hole is provided with the air paths such as the air groove, the inner cavity and the pore, so that the air discharge is noiseless, and an ash-free layer during the air replenishment can enter the first air chamber, thus keeping long-term precision.

DETAILED DESCRIPTION OF THE EMBODIMENTS

The present application is further described hereinafter with reference to the accompanying drawings by the embodiments.

First Embodiment

Figure 1:
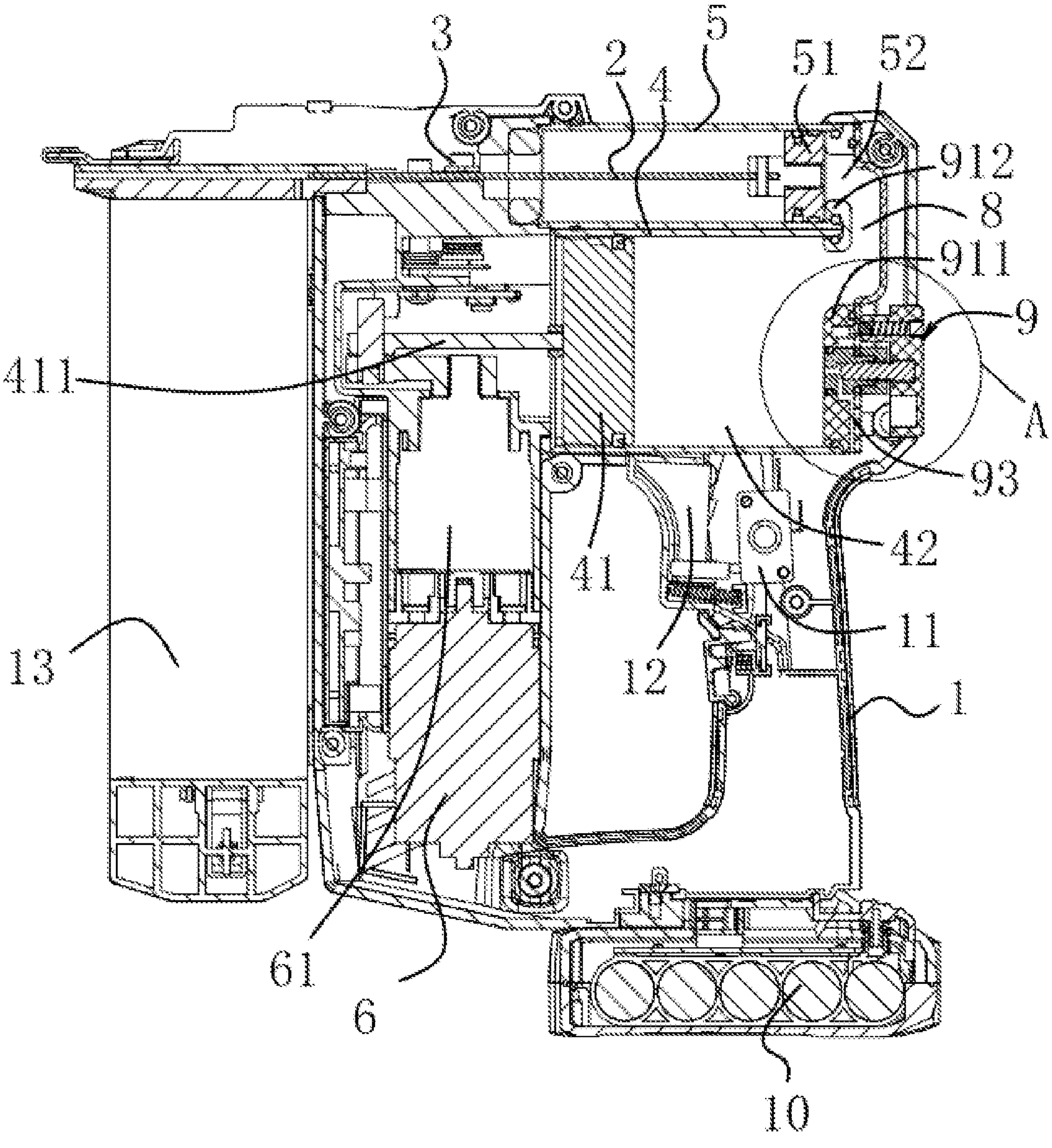
FIG. 1 is a schematic diagram of a sectional structure of a pneumatic nailing gun.

As shown in FIG. 1, a pneumatic nailing gun comprises a housing 1 and a striking pin 2 arranged on the housing 1 and capable of reciprocating to nail, a locking member 3 capable of locking or unlocking the striking pin 2 is arranged on the housing 1, the locking member 3 is provided with a locking hook, and a side portion of the striking pin 2 is provided with a clamping groove. When in a locked state, the locking hook is clamped in the clamping groove to keep the striking pin 2 locked and unable to move. A first cylinder 4 and a second cylinder 5 are further arranged in the housing 1, a first piston 41 capable of performing a compression stroke and a return stroke is arranged in the first cylinder 4, and a first air chamber 42 capable of storing air in the first cylinder 4 is defining with the first piston 41. A piston rod 411 is connected to the first piston 41, and a crank 412 is connected to the piston rod 411. A motor 6 arranged in the housing 1 is connected to a gear reducer 61, an output shaft of the gear reducer 61 is connected to the crank 412, and the piston rod 411 and the crank 412 form a crank connecting rod structure, which changes rotating power of the motor 6 into power for driving the first piston 41 to reciprocate linearly. A second piston 51 capable of reciprocating between a first position and a second position is arranged in the second cylinder 5, the first position refers to a position where the second piston 51 is located when the striking pin 2 is locked, the second position refers to a position where the second piston 51 is located after the striking pin performs nailing, and the striking pin 2 is fixedly connected to the second piston 51. A second air chamber 52 in the second cylinder 5 is defining with the second piston 51, and the first air chamber 42 and the second air chamber 52 are communicated with each other through a fully-closed ventilation channel 8, so that the first air chamber 42, the ventilation channel 8 and the second air chamber 52 form a pneumatic structure closed relative to the outside, A lower end of a holding portion of the housing 1 is further provided with a detachable battery 10, and the battery 10 supplies power to a motor control panel 11. The lower end of the holding portion of the housing 1 is further provided with a button 12, and the button 12 is also connected to the motor control panel 11. After the button 12 is pressed, the motor control panel 11 controls the motor 6 to drive the first piston 41 to perform the compression stroke and the return stroke. A front end of the housing 1 is provided with a nail box 13, and a nail in the nail box 13 may automatically rise to a position in front of the striking pin 2 under an action of a spring. After the first piston 41 completes the compression stroke, the locking hook is removed from the locking groove of the striking pin 2 by an unlocking mechanism, so that the striking pin 2 and the second piston 51 are both in an unlocked state. The second piston 51 moves at a high speed under an action of a high pressure to drive the striking pin 2 to hit the nail in front of the striking pin 2, thus completing a nailing action once. Then, the first piston 41 performs the return stroke, and under an action of a negative pressure, the second piston 51 returns from the first position to the second position, and the striking pin 2 is locked again by the locking hook. In the case of circulation, continuous nailing is realized.

Figure 2:
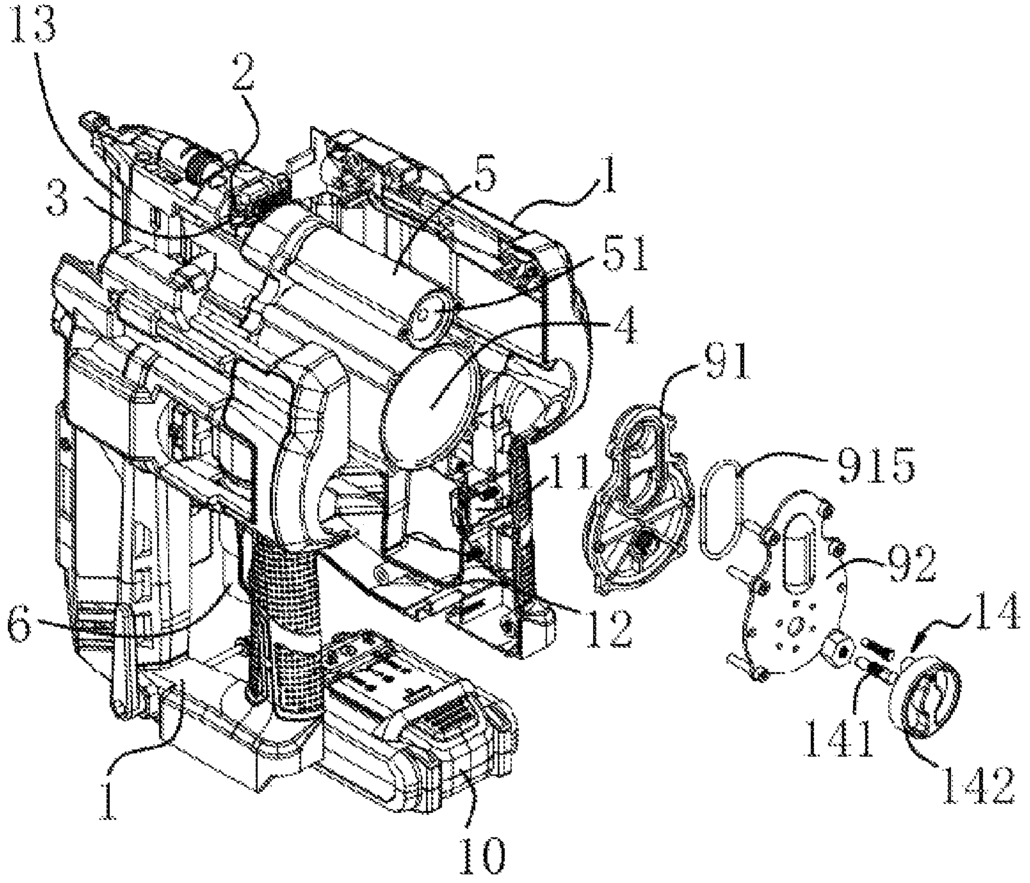
FIG. 2 is a schematic diagram of a partial stereoscopic exploded structure of the pneumatic nailing gun.

With reference to FIG. 1, as shown in FIG. 2, FIG. 2 is a stereoscopic exploded view of the pneumatic nailing gun. The air second cylinder 5 is located above the first cylinder 4, and the first cylinder 4 and the second cylinder 5 are coaxially arranged in parallel. A cylinder body end portion of the first cylinder 4 and a cylinder body end portion of the second cylinder 5 are provided with an air cylinder end cover 9 capable of sealing with a cylinder body of the first cylinder 4 and a cylinder body of the second cylinder 5, the first cylinder 4 and the second cylinder share the same air cylinder end cover 9, which is mounted on one sides of the first cylinder 4 and the second cylinder 5, thus forming the first air chamber 42 and the second air chamber 52 located on the same side, and the ventilation channel 8 is located in the air cylinder end cover 9. The air cylinder end cover 9 comprises an inner end cover 91 and an outer end cover 92, an inner side surface of the inner end cover 91 is provided with a first convex portion 911 inserted and hermetically connected in the cylinder body of the first cylinder 4 and a second convex portion 912 inserted and hermetically connected in the cylinder body of the second sir cylinder 5 respectively, a first through hole 913 penetrating through the inner end cover 91 is arranged in the first convex portion 911, a second through hole 914 penetrating through the inner end cover 91 is arranged in the second convex portion 912, a sealing ring 915 is arranged between the outer end cover 92 and the inner end cover 91, the sealing ring 915 encloses the first through hole 913 and the second through hole 914 in the sealing ring 915, and a groove 921 communicating the first through hole 913 with the second through hole 914 is arranged on an inner side surface of the outer end cover 92. By this structure, the outer end cover 92 is attached to an outer side surface of the inner end cover and fixed to the cylinder body of the first cylinder 4 and the cylinder body of the second cylinder 5 by bolts, and after the inner end cover 91 and the outer end cover 92 are fixedly attached, the above ventilation channel 8 is formed between the inner end cover 91 and the outer end cover 92.

Figure 3:
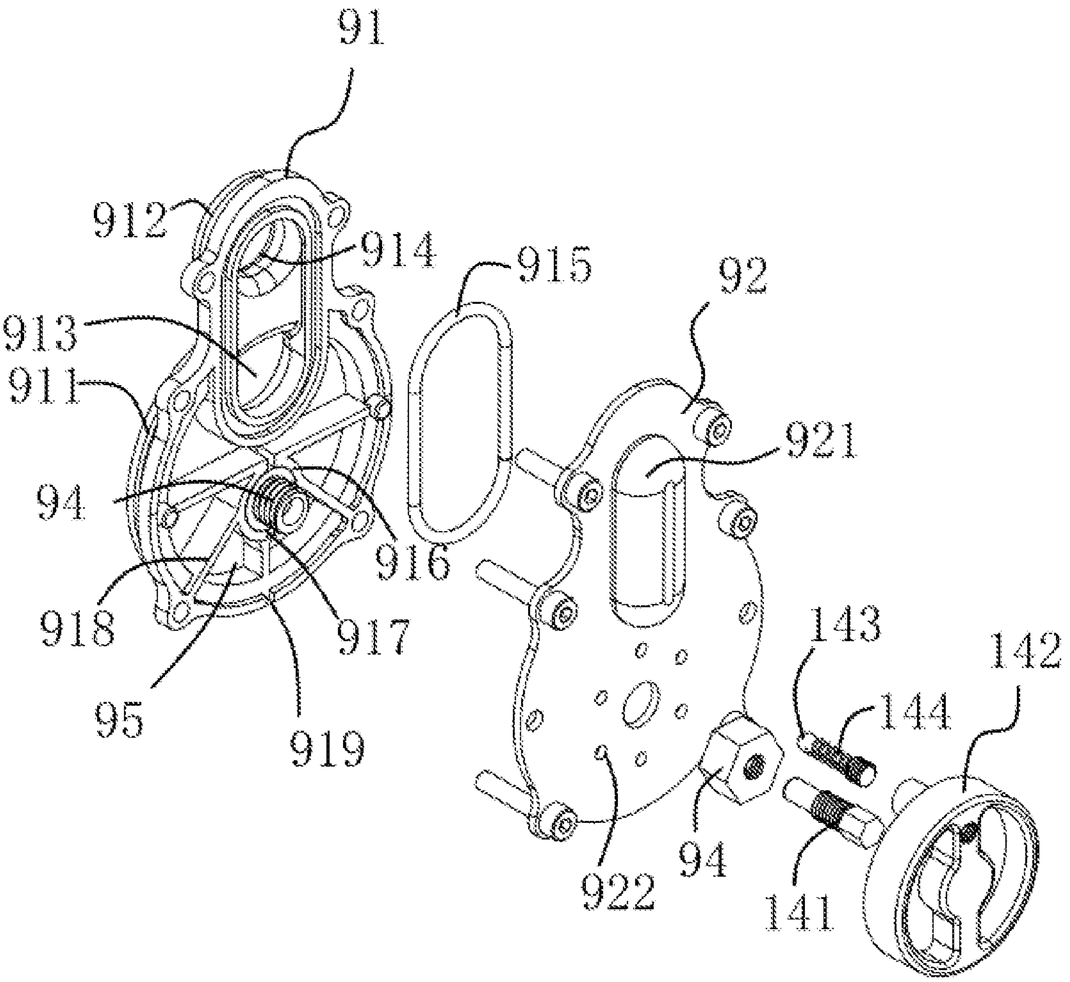
FIG. 3 is a schematic diagram of an enlarged stereoscopic structure of an air cylinder end cover of the pneumatic nailing gun in FIG. 2.
Figure 4:
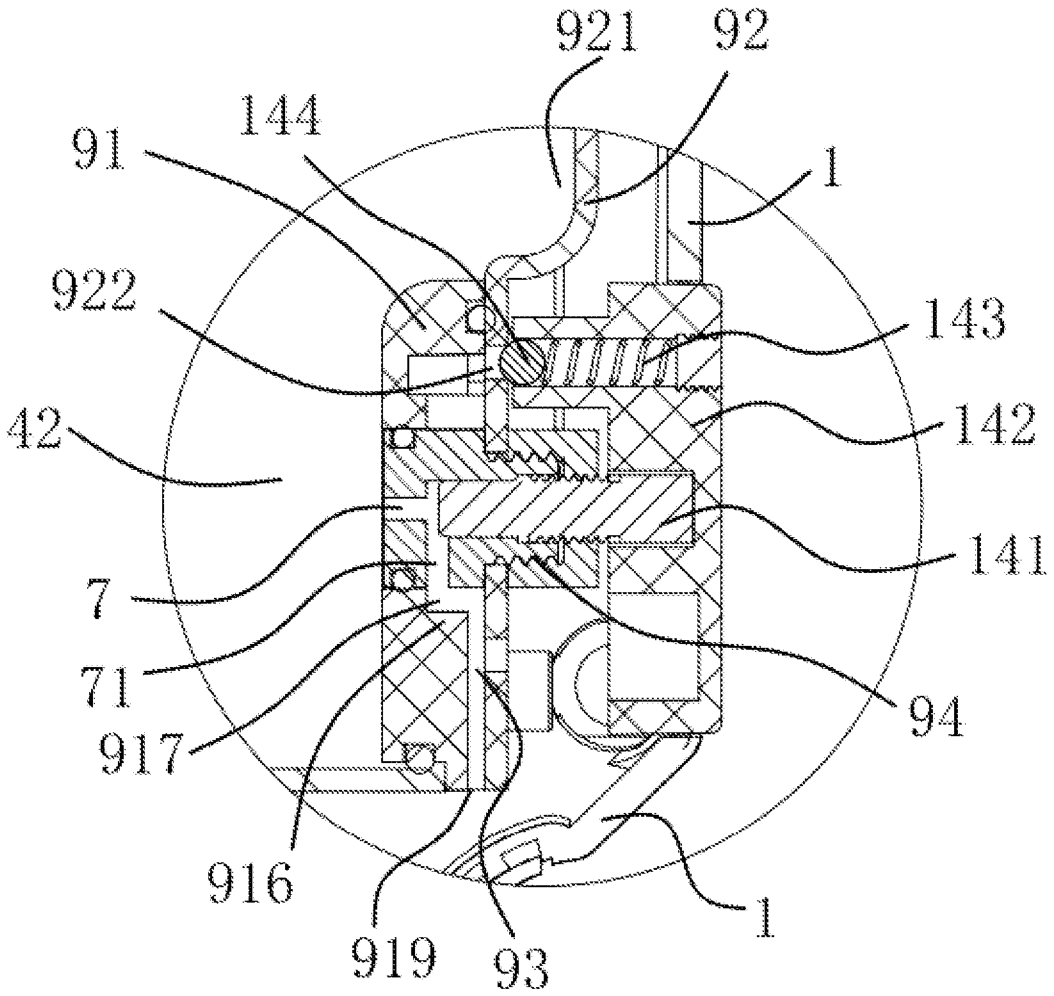
FIG. 4 is a schematic diagram of an enlarged stereoscopic structure of a part A in FIG. 1.

As shown in FIG. 3 and FIG. 4, a single air hole 7 communicated with the ventilation channel 8 is arranged in the air cylinder end cover 9, and an aperture of the air hole 7 is 0.5 mm to 5 mm. A handle 14 capable of adjusting a ventilation capacity between the air hole 7 and the outside is arranged on the housing 1, the handle 14 comprises a threaded rod 141, the threaded rod 141 is connected with the air cylinder end cover 9 through a thread, an inner end of the threaded rod 141 is a blocking end, and the blocking end is capable of being located in different positions in the air hole 7 after adjusting the handle, thus changing an air output of the air hole 7. As an alternative structure, the air hole 7 may be arranged in the cylinder body of the first cylinder 4 or the cylinder body of the second cylinder 5, and the air hole 7 is communicated with the first air chamber 42 or the second air chamber 52. Alternatively, a plurality of air holes 7 may also be provided, and a total ventilation capacity of the plurality of air holes is the same as or similar to that of the single air hole with the aperture of 0.5 mm to 5 mm. In order to improve a strength, a cylindrical mounting seat 94 made of metal copper and other materials is arranged on the inner end cover 91 and the outer end cover 92 of the air cylinder end cover 9, and the mounting seat 94 is embedded in the air cylinder end cover 9 made of plastic. A threaded hole is arranged in one end of the mounting seat 94, the air hole 7 is arranged in the other end of the mounting seat and an air inlet hole 145*a* is arranged in the other end of the mounting seat, the threaded rod 141 of the handle 14 is connected in the threaded hole through a thread, an inner end of the threaded rod 141 extends to the hole opening of the air hole 7 and is located between the air hole 7 and the air inlet hole 145*a*. The handle 14 comprises a turntable 142 connected to an outer end of the threaded rod 141, a steel ball 143 for positioning and a spring 144 acting on the steel ball 143 are further arranged at an edge of the turntable 142, a plurality of positioning holes 922 uniformly distributed in a circumferential direction are arranged on an outer side surface of the air cylinder end cover 9, and the steel ball 143 abuts in a hole opening of one of positioning holes 922 under an action of the spring 144. When rotating the turntable, the turntable 142 rotates with an axial direction of the threaded rod 141 as a center of circle, and because the steel ball 143 abuts in one hole opening under an action of the spring 144, during rotation, the steel ball 143 may be separated from the original hole opening to enter the next hole opening along a track and make an impact sound to prompt a user to rotate the turntable to the next adjustment position to be positioned.

The air hole 7 keeps the pneumatic structure in communication with the outside through an air path 93 arranged in the air cylinder end cover 9, and the air path 93 is arranged in a lower half portion of the air cylinder end cover 9 and located below the ventilation channel 8. Specifically, the air path 93 comprises a cylindrical fixed seat 916 arranged on an outer side surface of the inner end cover 91, the mounting seat 94 is inserted in the fixed seat 916 and sealed with the fixed seat 916, a ventilation groove 917 communicated with the air inlet hole 145*a* is arranged on the fixed seat 916, a plurality of ribs 918 are arranged outside the fixed seat 916 on the outer side surface of the inner end cover 91, a concave cavity 95 is formed between the ribs 918, a pore 919 communicated with the outside is arranged at an outer edge of the inner end cover 91, and the ventilation groove 917, the concave cavity 95 and the pore 919 are communicated with each other.

A working process of the present application is shown in FIG. 5 to FIG. 9. The first air chamber 42, the ventilation channel 8 and the second air chamber 52 form the pneumatic structure, positions of the first piston 41 and the second piston 51 shown in FIG. 1 are in an initial state, and the air hole 7 in the pneumatic structure keeps the determined ventilation capacity with the outside when the handle 14 is adjusted in advance. When the second piston 51 is located in the first position, which means that the first piston 51 retracts at a bottom portion of the second cylinder 5, the locking member 3 with the locking hook locks the striking pin 2.

Figure 5:
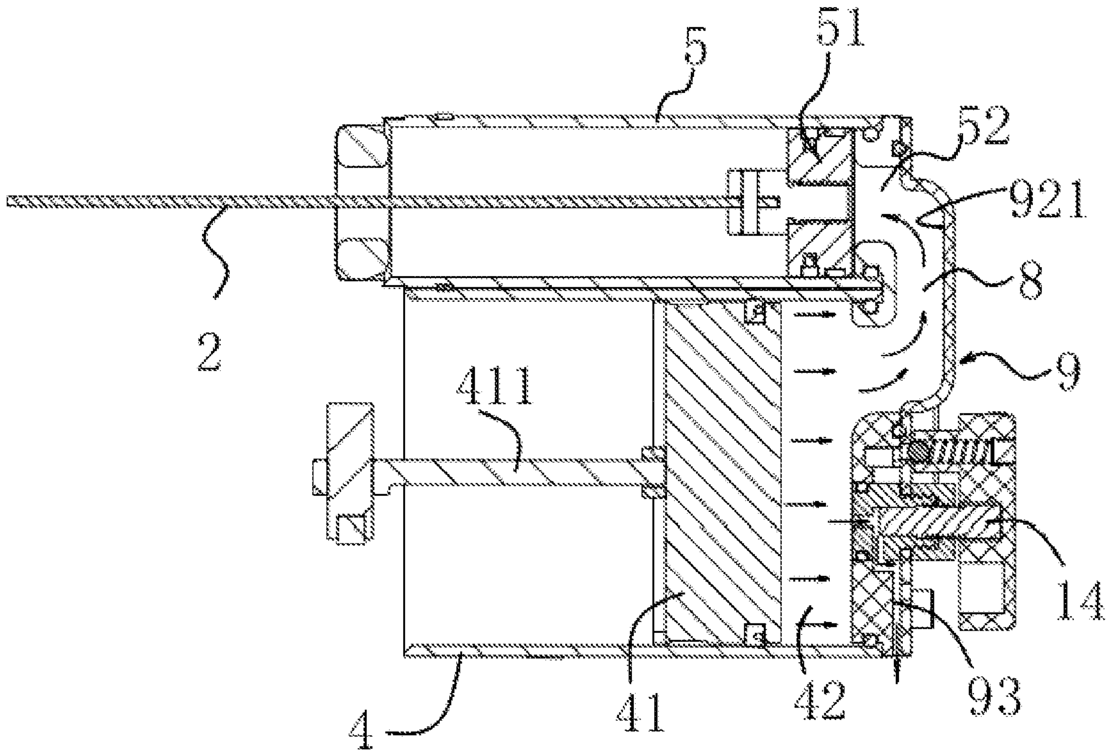
FIG. 5 is a schematic structural diagram of a state of a pneumatic structure when a first piston performs a compression stroke.

As shown in FIG. 5, the first piston 41 performs the compression stroke, so that air in the first cylinder 4 is compressed to produce high pressure air, thus forming a high pressure state in the whole pneumatic structure. Because the air hole 7 is kept in communication with the outside through the air path 93, a part of the high pressure air is discharged to the outside through the ventilation groove 917, the concave cavity 95 and the pore 919, so that a pressure value of actual high pressure air is smaller than a pressure value produced by a predetermined stroke of the first piston 41, so as to adjust the nailing force.

Figure 6:
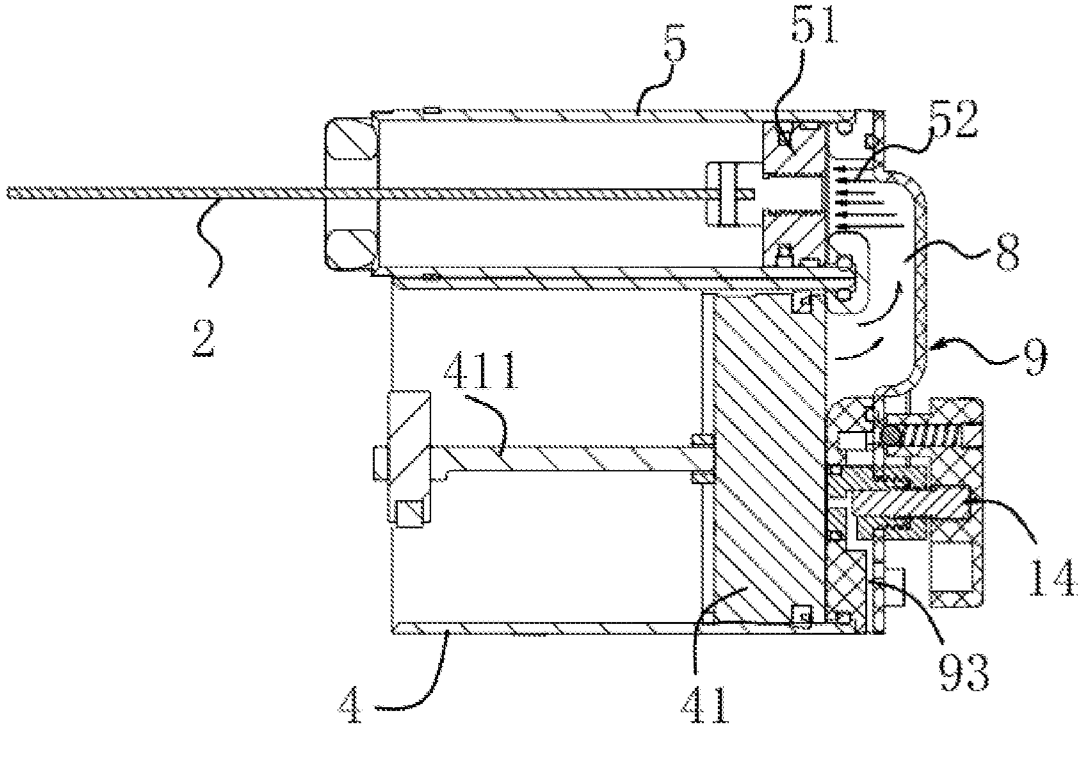
FIG. 6 is a schematic structural diagram of a state of the pneumatic structure when the first piston completes the compression stroke.
Figure 7:
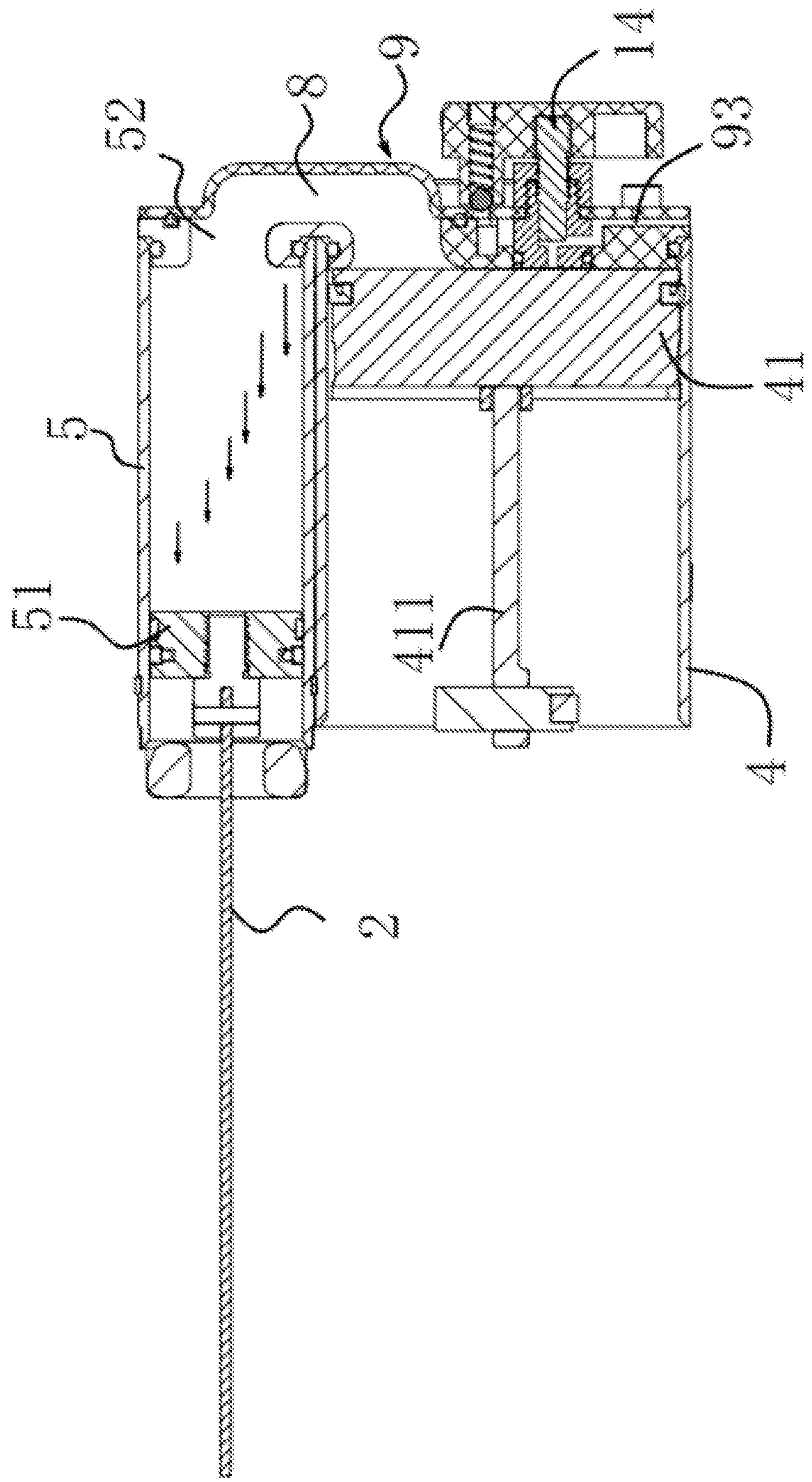
FIG. 7 is a schematic structural diagram of a state of the pneumatic structure after nailing.

As shown in FIG. 6 and FIG. 7, after the first piston 41 completes the compression stroke, the locking hook is removed from the locking groove of the striking pin 2 by an unlocking mechanism, and the locking member 3 is in a release state, so that the striking pin 2 and the second piston 51 are both in an unlocked state. The second piston 51 moves at a high speed under an action of a high pressure to drive the striking pin 2 to hit the nail in front of the striking pin 2, thus completing a nailing action once. At the moment, the second piston 51 is located in the second position.

Figure 8:
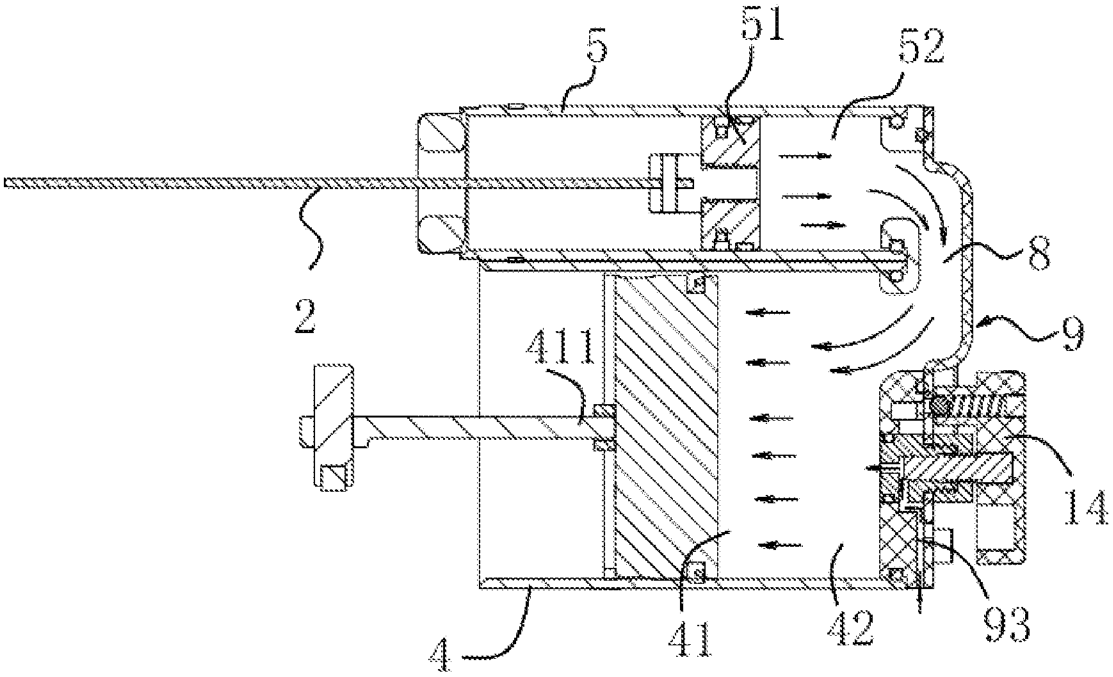
FIG. 8 is a schematic structural diagram of a state of the pneumatic structure when the first piston performs a return stroke.

As shown in FIG. 8, the first piston 41 performs the return stroke. Because the pneumatic structure formed by the first air chamber 42, the ventilation channel 8 and the second air chamber 52 is closed except the air hole 7, and during the return stroke, the first air chamber 42 produces a negative pressure relative to the second air chamber 52, and the second piston 51 in the second cylinder 5 moves to the first position. In the return process, the air hole 7 is kept in communication with the outside, and a pressure of the first air chamber 42 is also lower than an atmospheric pressure, so that the first air chamber 42 is filled with a part of air in advance through the ventilation groove 917, the concave cavity 95 and the pore 919, and air needed by the first air chamber 42 is replenished in advance. Because only a certain amount of external air enters the first air chamber 42 after the air hole is matched with the handle, it is insufficient to affect the negative pressure produced by the first air chamber 42 relative to the second air chamber 52, and a gradually increased torque of the motor 6 can be smoothed when the first piston 41 returns, so that the motor 6 runs steadily and the motor 6 keeps running precisely.

Figure 9:
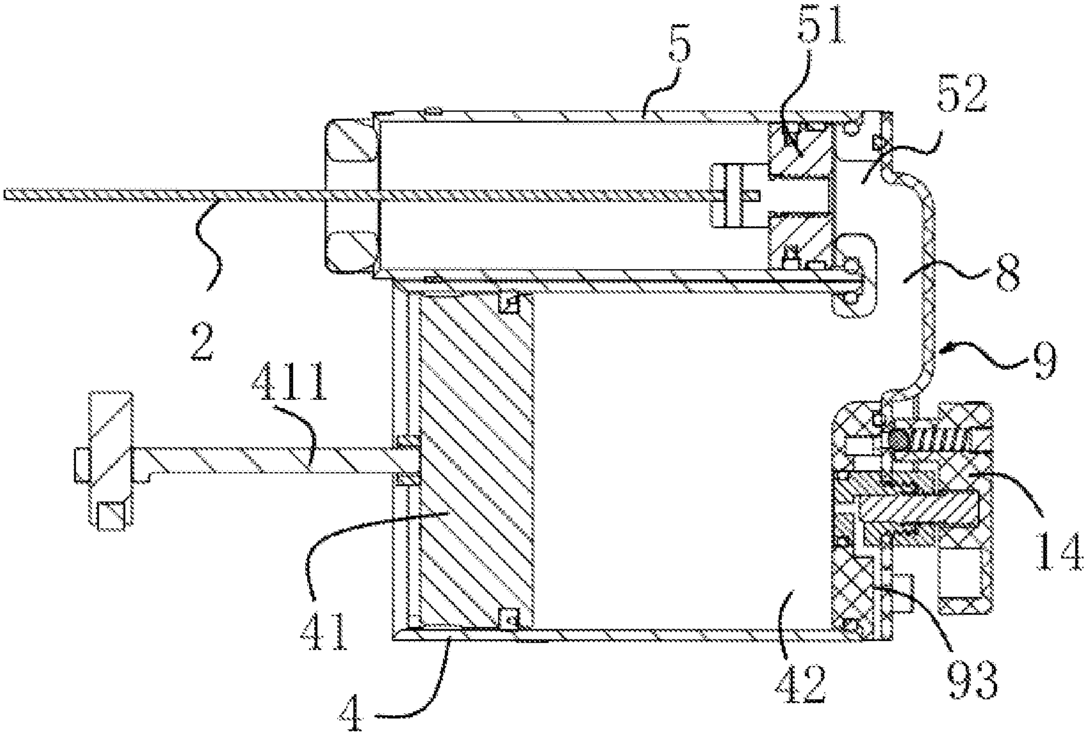
FIG. 9 is a schematic structural diagram of the pneumatic structure returning to an initial state when the first piston completes the return stroke.
Figure 10:
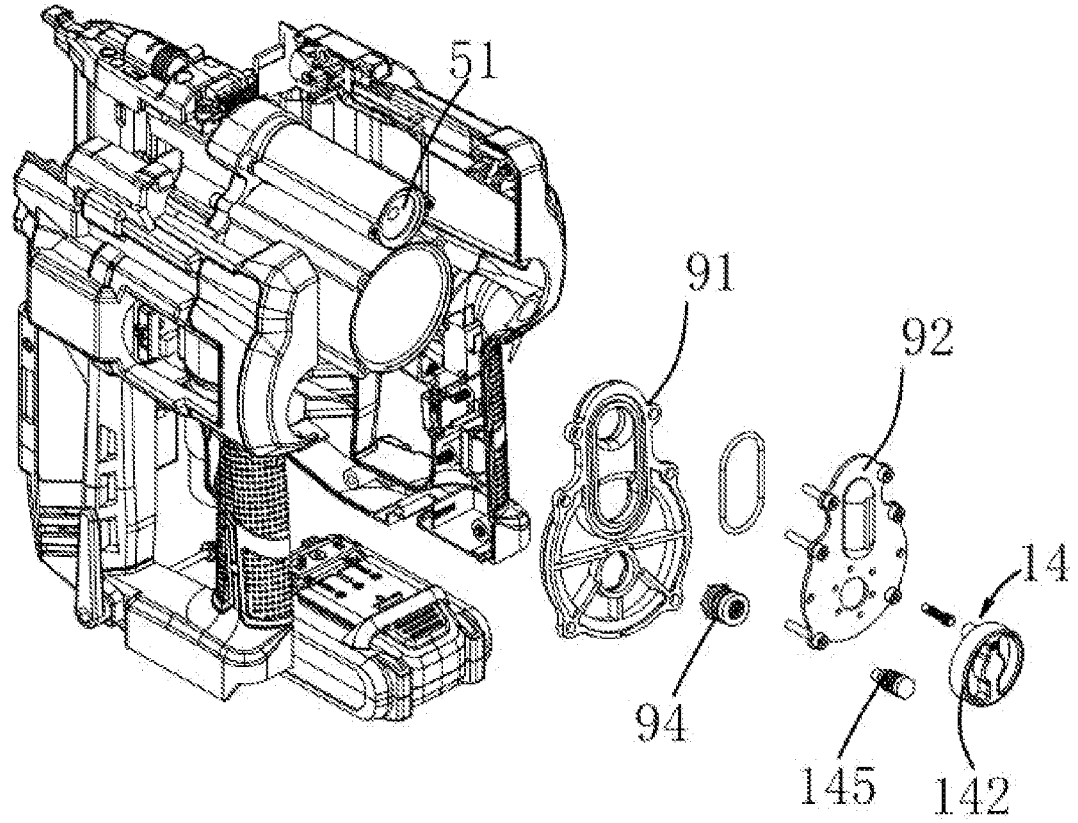
FIG. 10 is a schematic diagram of a partial stereoscopic exploded structure in Second Embodiment of the pneumatic nailing gun.
Figure 11:
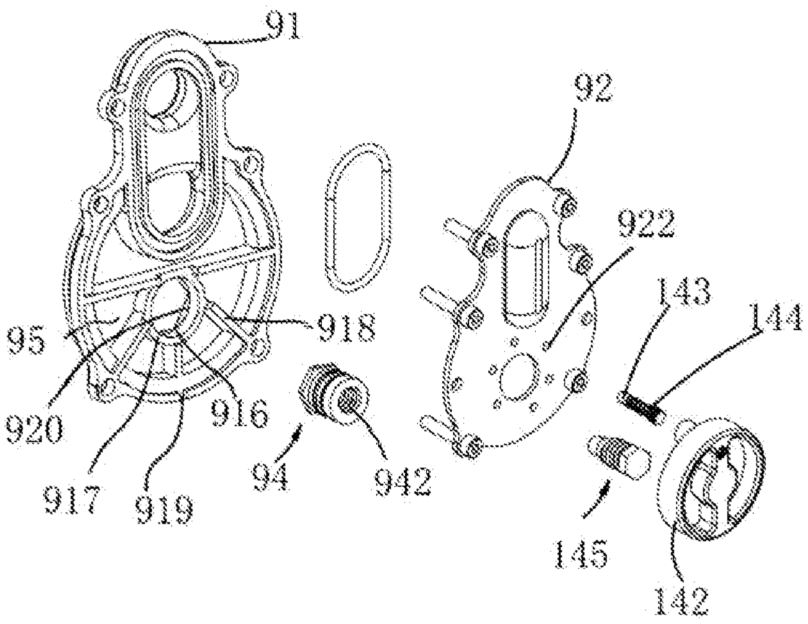
FIG. 11 is a schematic diagram of a partial enlarged stereoscopic structure of an air cylinder end cover of the pneumatic nailing gun in FIG. 10.
Figure 12:
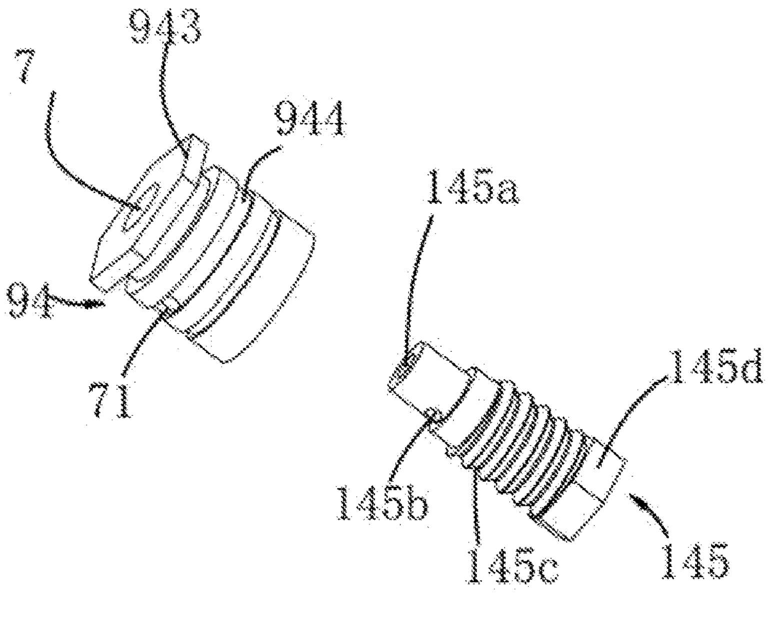
FIG. 12 is a schematic diagram of an enlarged stereoscopic structure of a mounting seat and a ventilation column in Second Embodiment of the pneumatic nailing gun.
Figure 13:
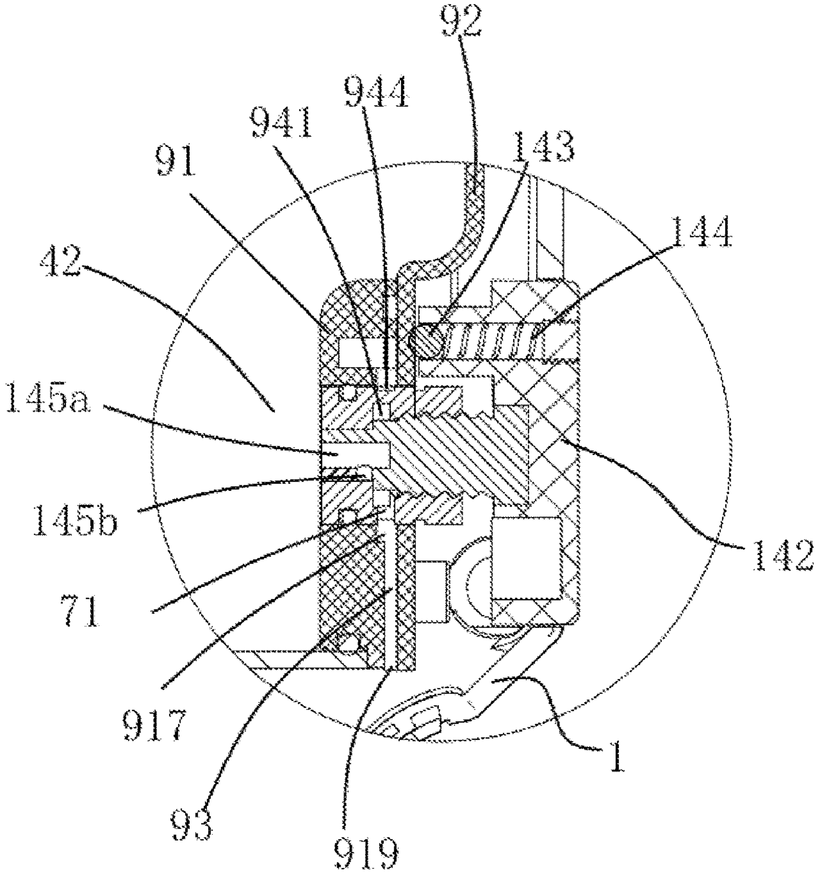
FIG. 13 is a schematic diagram of an enlarged sectional structure of the air cylinder end cover in Second Embodiment.

As shown in FIG. 9, when the first piston 41 returns to the initial position, the second piston 51 also returns to the first position under an action of the negative pressure, and the striking pin is locked again by the locking member 3 to complete one nailing circulation.

Second Embodiment

As shown in FIG. 10 to FIG. 13, Second Embodiment is basically the same as First Embodiment in structure, with a difference in that, in Second embodiment, the mounting seat 94 and the fixed seat 916 in the nailing gun are of another structure. The mounting seat 94 comprises a flange 943, the flange 943 has a hexagonal structure, and the flange 943 is mounted in the mounting groove 96 of the inner end cover 91. The mounting seat 94 comprises the air hole 7, the air hole 7 is communicated with a ventilation ring 941, the ventilation hole 71 is formed in the ventilation ring 941, the ventilation hole 71 is communicated with the air inlet hole 145*a*, and an annular groove 944 is formed on an outer wall of the mounting seat 94. In this embodiment, the ventilation groove 917 of another structure is further arranged on the inner end cover 91, and the annular groove 944 is communicated with the ventilation groove 917.

A ventilation column 145 is located in the mounting seat 94, the ventilation column 145 comprises a ventilation rod, the air inlet hole 145*a* and an inner air hole 145*b* communicated with the air inlet hole 145*a* are arranged in the ventilation rod, and the air inlet hole 145*a* is communicated with the first air chamber 42. A screw 145*c* is arranged on the ventilation column 145, the mounting seat 94 is further provided with a threaded hole 942, the screw 145*c* is mounted in the threaded hole 942 through a thread, and the ventilation column 145 is connected with the handle 14 through a boss 145*d*. When the handle 14 rotates, the screw 145*c* and the threaded hole 942 rotate relatively, and the ventilation column 145 moves in the air hole 7.

Figure 14:
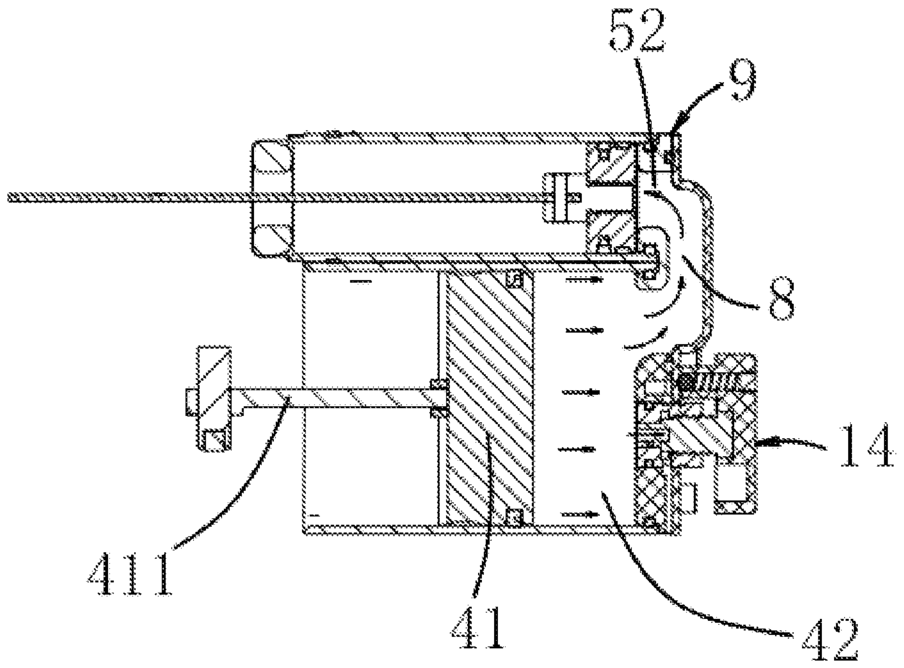
FIG. 14 is a schematic diagram of a sectional structure of an inner air hole and a ventilation hole in Second Embodiment of the nailing gun which are not conducted.
Figure 15:
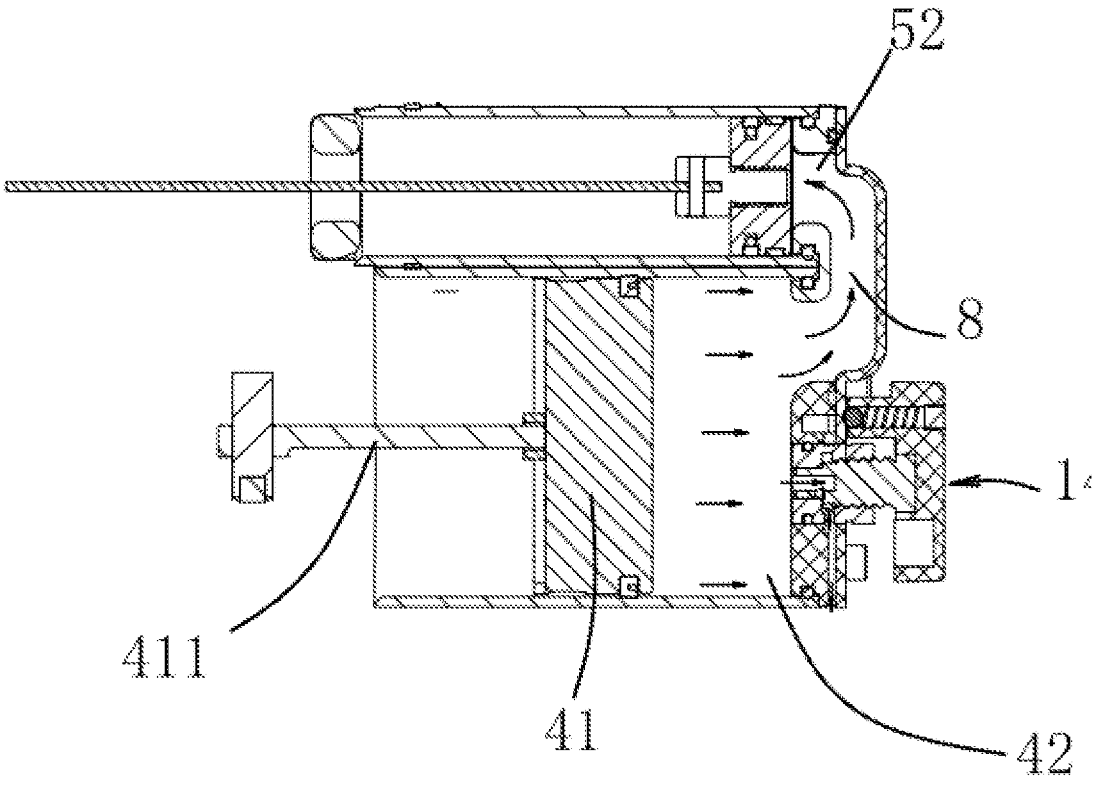
FIG. 15 is a schematic diagram of a sectional structure of the inner air hole and the ventilation hole in Second Embodiment of the nailing gun which are partially conducted.
Figure 16:
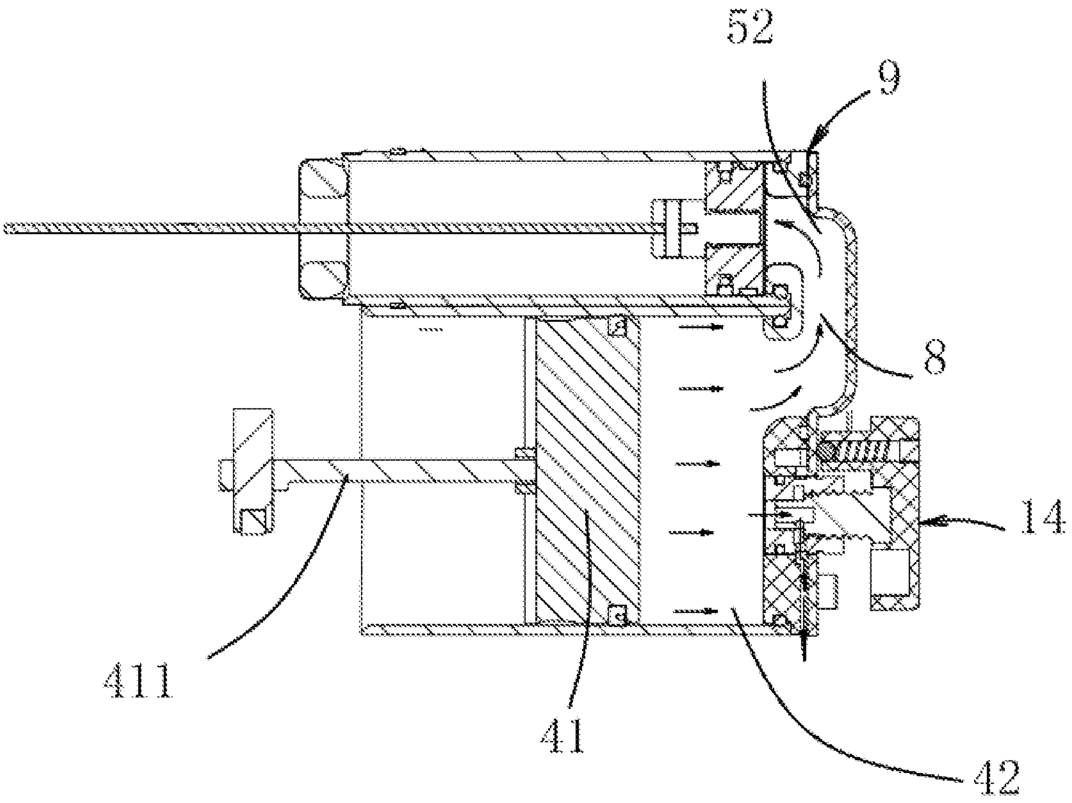
FIG. 16 is a schematic diagram of a sectional structure of the inner air hole and the ventilation hole in Second Embodiment of the nailing gun which are wholly conducted.
Figure 17:
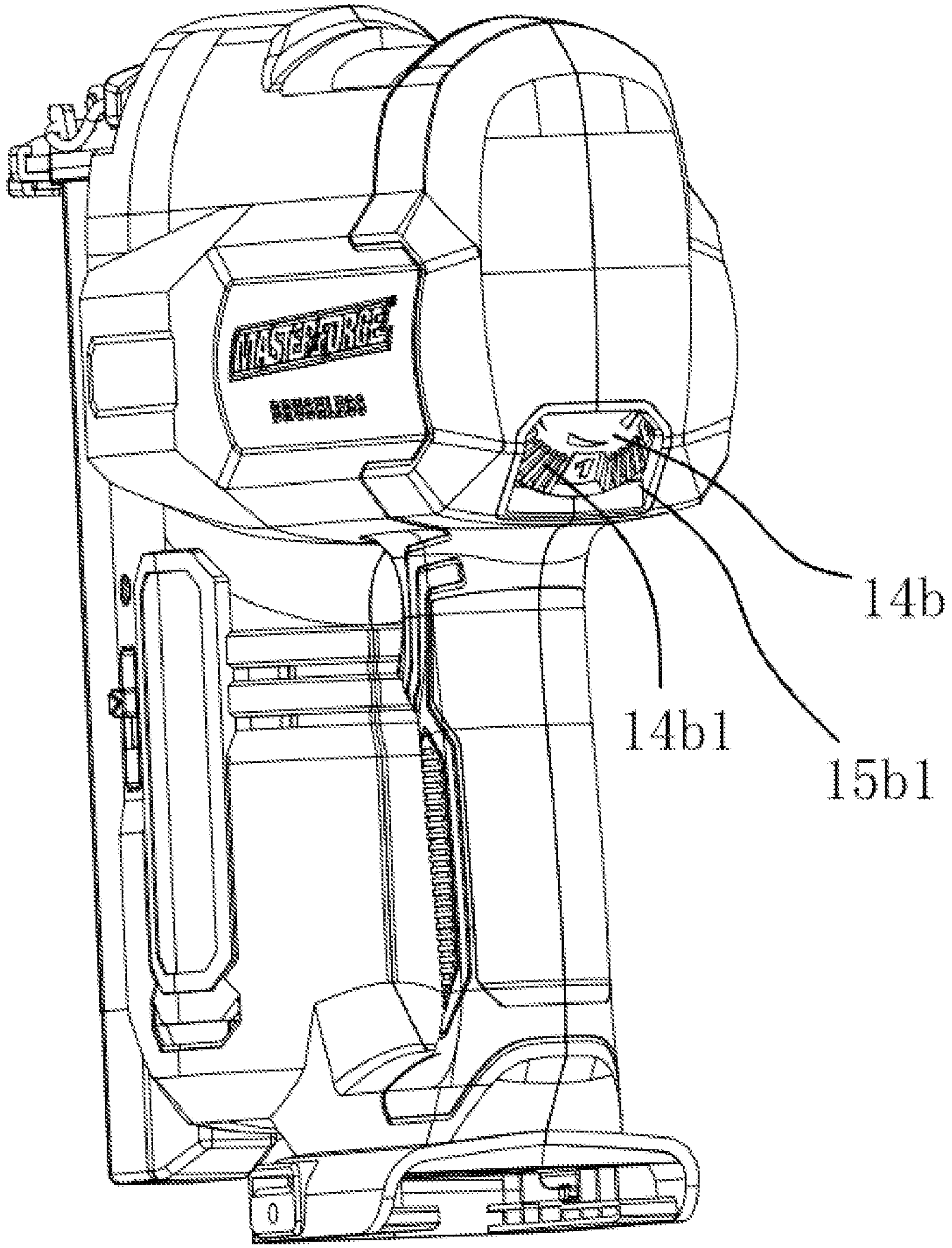
FIG. 17 is a schematic diagram of a stereoscopic structure of Third Embodiment of the nailing gun.
Figure 18:
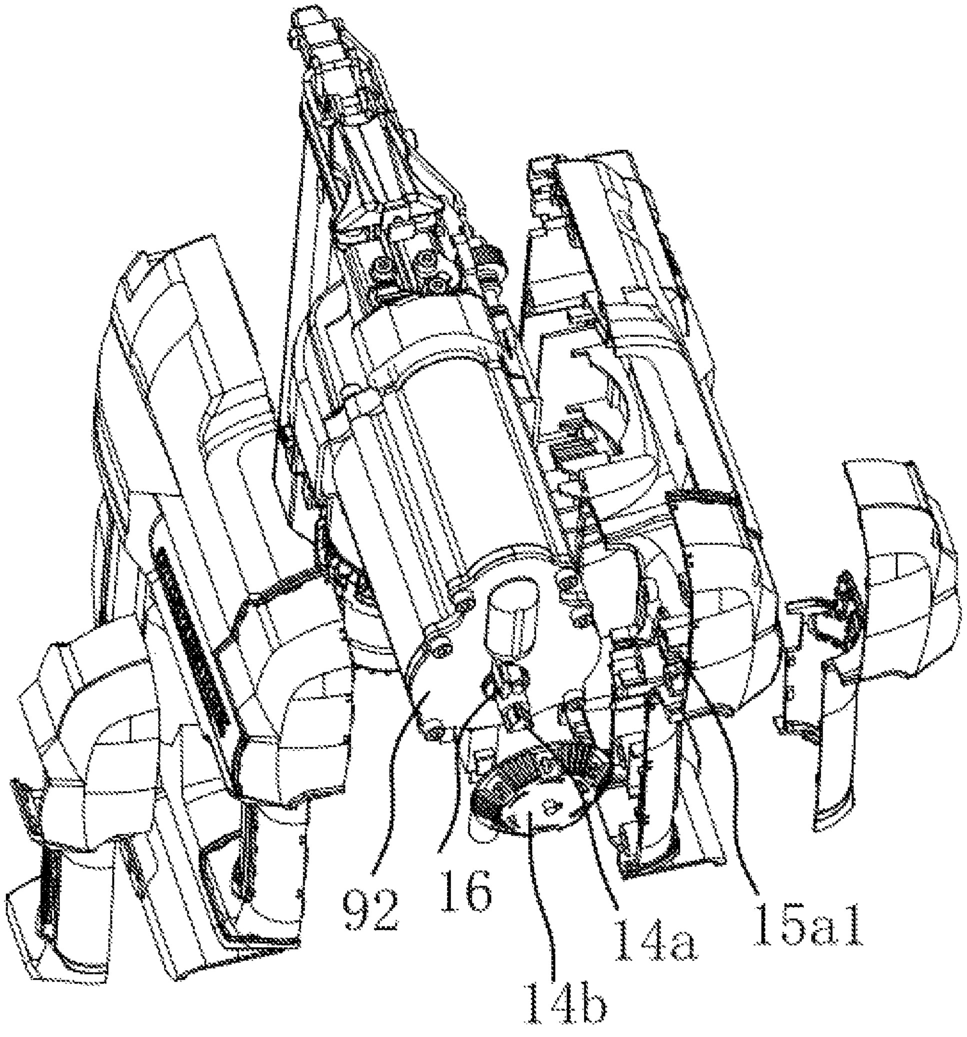
FIG. 18 is a schematic diagram of an exploded structure of Third Embodiment.

A working principle of this embodiment is as shown in FIG. 13 to FIG. 16, and is specifically as follows. The nailing force adjustment of the nailing gun is realized by adjusting the handle 14 to change a ventilation capacity between the pneumatic structure and external atmosphere, and the ventilation capacity adjustment is mainly determined by changing an overlapping degree of the inner air hole 145*b* and the ventilation ring 941. As shown in FIG. 14, when the nailing gun is in an initial state, air in the first air chamber 42 diffuses into the air inlet hole 145*a* of the ventilation column 145, and because the inner air hole 145*b* is located in the air hole 7 at the moment, the inner air hole 145*b* and the ventilation ring 941 are completely staggered, so that the pneumatic structure is isolated from the external atmosphere, and after the piston in the first cylinder 4 completes the compression stroke, a pressure value of actual high pressure air in the first air chamber 42 is equal to a pressure value produced by a predetermined stroke of the first piston 41 at the moment. As shown in FIG. 15, when the handle 14 is adjusted, the ventilation column 145 rotates in the mounting seat 94, and when the inner air hole 145*b* in the ventilation rod and the ventilation ring 941 are partially overlapped, air in the pneumatic structure is communicated with the external atmosphere through the air inlet hole 145*a*, the inner air hole 145*b*, the ventilation ring 941 and the ventilation hole 71, and the pressure value of the actual high pressure air in the first air chamber 42 is smaller than the pressure value produced by the predetermined stroke of the first piston 41 at the moment. As shown in FIG. 16, when the inner air hole 145*b* and the ventilation ring 941 are completely overlapped by adjusting the handle 14, the pressure value of the actual high pressure air in the first air chamber 42 is smaller than the pressure value produced by the predetermined stroke of the first piston 41 at the moment. In this embodiment, the handle 14 needs to rotate for a certain number of turns to partially align the inner air hole 145*b* with the ventilation ring 941, and then a ventilation capacity between the pneumatic structure and the outside starts to be changed, thus avoiding the situation that when an operator touches the handle 14 unintentionally, the handle 14 rotates to change the position of the blocking portion, so that the pneumatic structure is communicated with the outside. Meanwhile, the ventilation rod is located in the through hole 7 of the mounting seat 94, so that a sealing performance in the mounting seat 94 is ensured, and the adjustment precision of the nailing force of the nailing gun is improved.

Third Embodiment

Figure 19:
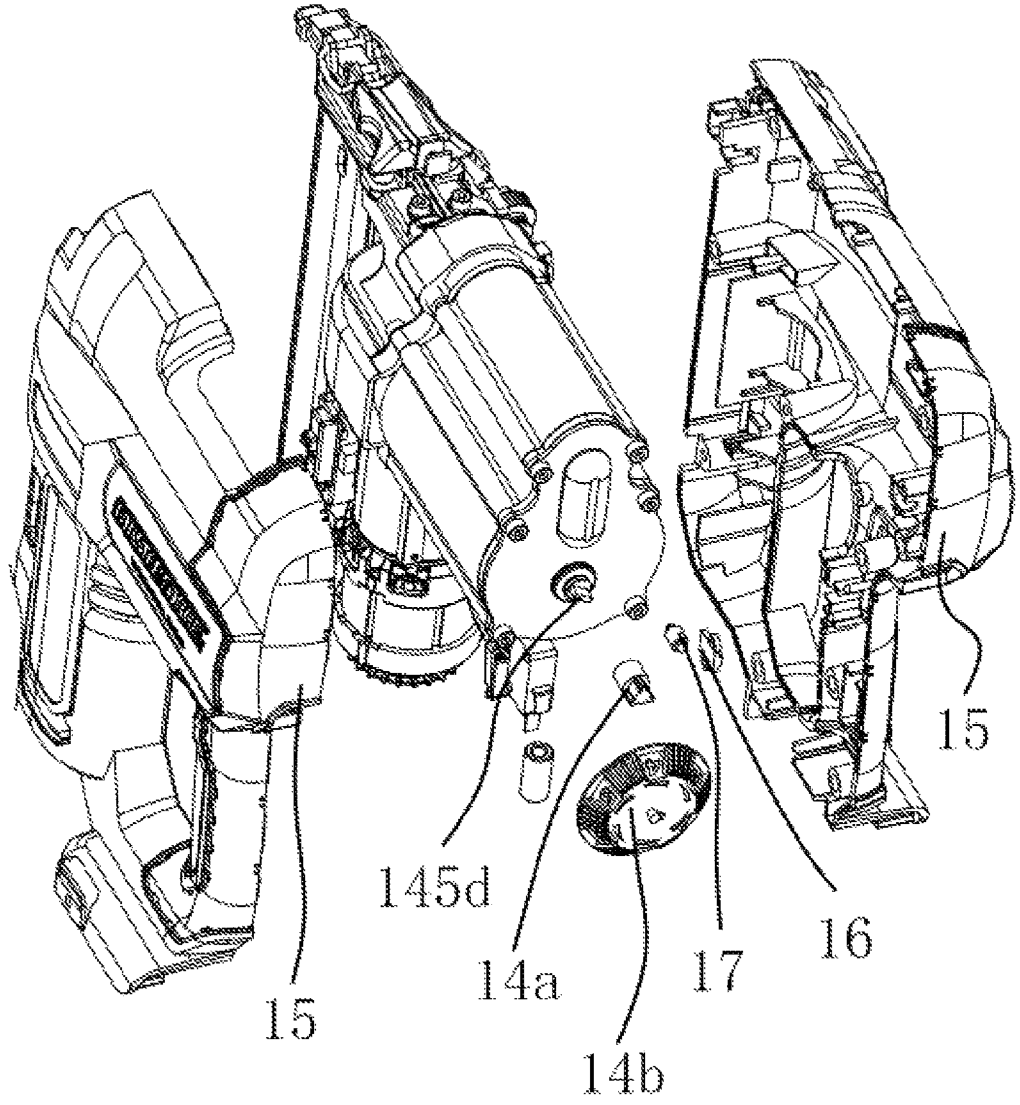
FIG. 19 is a schematic breakdown diagram of a partial structure in Third Embodiment.
Figure 20:
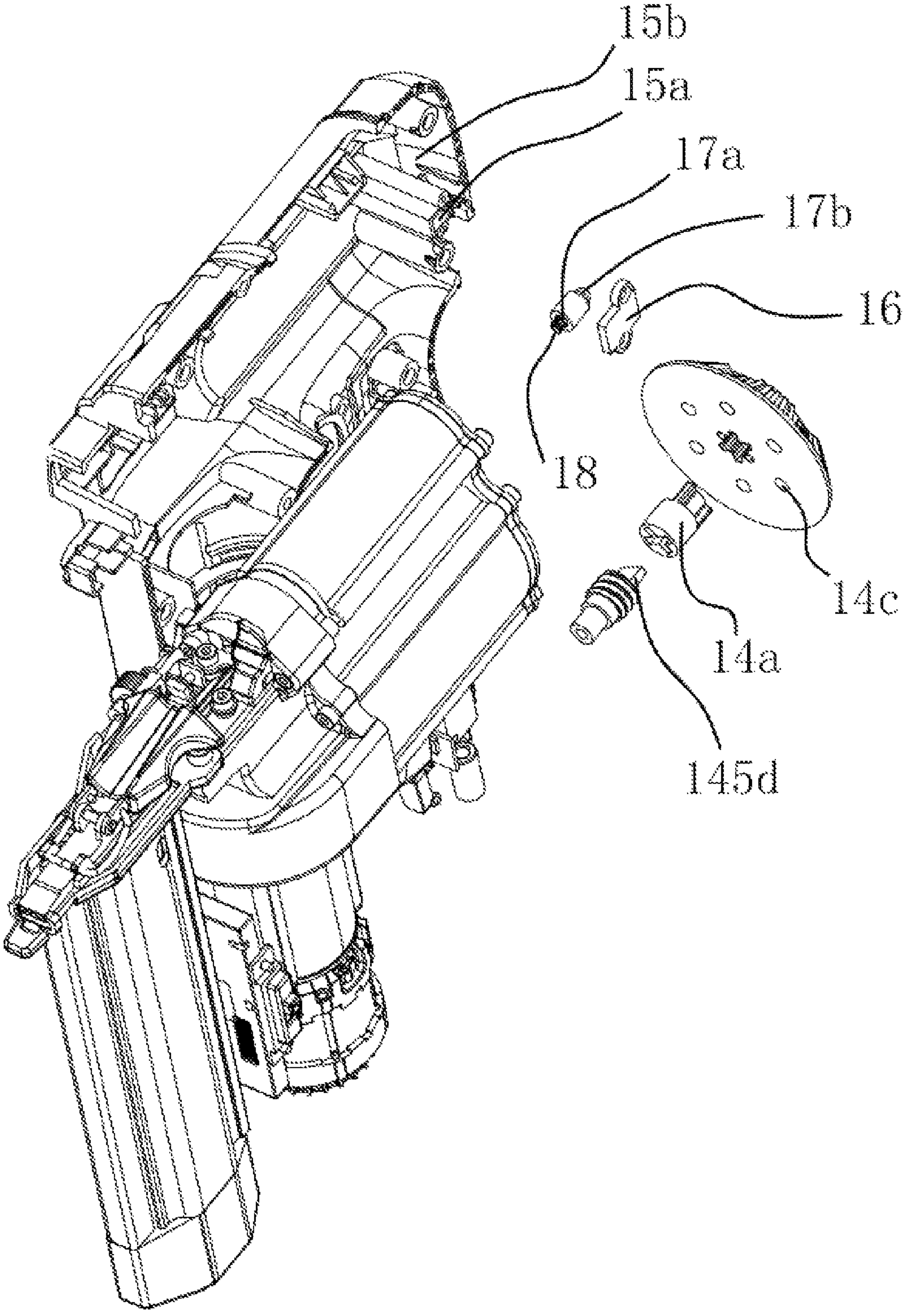
FIG. 20 is a schematic breakdown diagram of a partial structure in Third Embodiment.

As shown in FIG. 17 to FIG. 20, Second Embodiment is basically the same as First Embodiment in structure, with a difference in that, the boss 145*d* has a structure as shown in FIG. 19, the handle 14 comprises a connecting rod 14*a* connected with the boss 145*d* and a boss turntable 14*b* connected to an outer end of the connecting rod 14*a*, a fixed groove 15*a* is arranged on an outer housing 15 of the nailing gun, a cover plate 16 is mounted on a groove opening of the fixed groove 15*a*, a movable rod 17 is arranged in the fixed groove 15*a*, one end of the movable rod 17 is provided with a spring groove 17*a*, the spring groove 17*a* is provided with a second spring 18, the second spring 18 abuts against the air cylinder end cover 9, and the other end of the movable rod 17 is a spherical boss 17*b*. A spherical groove 14*c* matched with the spherical boss 17*b* in shape is formed on the boss turntable 14*b*, and the spherical boss 17*b* passes through a U-shaped opening 15*a*1 of the fixed groove 15*a* and abuts against the spherical groove 14*c*. A rotating groove 15*b* is further arranged on the outer housing 15, the boss turntable 14*b* rotates in the rotating groove 15*b*, numbers corresponding to the spherical groove 14*c* are further arranged on an end surface of the boss turntable 14*b*, the corresponding herein means that each number represents one spherical groove 14*c*, and the numbers are arranged on a touch table 14*b*1 of the boss turntable 14*c* at intervals. The rotating groove 15*b* is provided with an opening 15*b*1, and when adjusting the boss turntable 14*b*, a user places the boss turntable on the touch table 14*b*1 through the opening 15*b*1 to make the boss turntable 14*c* rotate, and a rotation mark is further arranged on the boss turntable 14*c* for prompting a direction of rotation.

The specific embodiments described herein are only illustrative to the spirit of the present application. Those skilled in the technical field to which the present application belongs may make various modifications or supplements to the specific embodiments described or make substitutions in a similar way, without departing from the spirit of the present application or exceeding the scope defined by the appended claims.

Although many terms such as the housing, the striking pin, the crank and the first cylinder are used herein, the possibility of using other terms is not excluded. These terms are only used to describe and explain the essence of the present application more conveniently; and the explanation of the terms as any additional restrictions is against the spirit of the present application.

What is claimed is:

1. A pneumatic nailing gun with an adjustable nailing force, comprising:

- a housing,
- a striking pin arranged in the housing and capable of reciprocating to nail,
- a first cylinder and a second cylinder arranged in the housing,
- a first piston arranged in the first cylinder and defining a first air chamber with the first cylinder for storing air in the first cylinder, the first piston being driven by a motor to reciprocate linearly to perform a compression stroke and a return stroke,
- a second piston arranged in the second cylinder and capable of reciprocating between a first position and a second position, the second piston defining a second air chamber with the second cylinder, and the striking pin being fixedly connected to the second piston,
- a ventilation channel through which the first air chamber and the second air chamber communicated with each other, so that the first air chamber, the ventilation channel and the second air chamber form a pneumatic structure closed relative to the outside,
- an air hole arranged in the pneumatic structure and capable of keeping the pneumatic structure in communication with the outside,
- a handle arranged on the housing and capable of adjusting a ventilation capacity between the air hole and the outside,
- wherein when the second piston is located in the first position and the striking pin is locked, the first piston performs the compression stroke to compress air in the first air chamber, and a part of the compressed air is discharged to the outside through the air hole, and
- wherein when the second piston is located in the second position and the striking pin is unlocked, the first piston performs the return stroke to make the second piston return to the first position to be locked, and a part of external air is sucked into the pneumatic structure through the air hole.

2. The pneumatic nailing gun with the adjustable nailing force according to claim 1, wherein the second cylinder is coaxially located outside the first cylinder in parallel, a cylinder body end portion of the first cylinder and a cylinder body end portion of the second cylinder are provided with an air cylinder end cover capable of sealing with a cylinder body of the first cylinder and a cylinder body of the second cylinder, the above ventilation channel is located in the air cylinder end cover, the above air hole is arranged in the air cylinder end cover or the cylinder body of the first cylinder or the cylinder body of the second cylinder, and the air hole is communicated with the ventilation channel or communicated with the first air chamber or the second air chamber.

3. The pneumatic nailing gun with the adjustable nailing force according to claim 2, wherein a single air hole is provided, with an aperture of 0.5 mm to 5 mm, or a plurality of air holes are provided.

4. The pneumatic nailing gun with the adjustable nailing force according to claim 3, wherein the handle comprises a swinging rod hinged on the housing, an end portion of the swinging rod is provided with a shielding plate, and the shielding plate is capable of shielding a part of air hole after adjusting the handle, thus changing an air output of the air hole.

5. The pneumatic nailing gun with the adjustable nailing force according to claim 2, wherein the handle comprises a threaded rod, the threaded rod is connected with the air cylinder end cover through a thread, an inner end of the threaded rod is a blocking end, and the blocking end is capable of being located in different positions and blocking the air hole after adjusting the handle, thus changing an air output of the air hole.

6. The pneumatic nailing gun with the adjustable nailing force according to claim 5, wherein the handle comprises a turntable fixedly connected to an outer end of the threaded rod, a steel ball for positioning and a spring acting on the steel ball are further arranged on the turntable, a plurality of positioning holes uniformly distributed in a circumferential direction are arranged on an outer side surface of the air cylinder end cover, and the steel ball abuts in a hole opening of one of positioning holes under an action of the spring.

7. The pneumatic nailing gun with the adjustable nailing force according to claim 6, wherein a cylindrical mounting seat is arranged on the air cylinder end cover, a threaded hole is arranged in one end of the mounting seat, the above air hole is arranged in the other end of the mounting seat and a ventilation hole is arranged in the other end of the mounting seat, the threaded rod of the handle is connected in the threaded hole through a thread, an inner end of the threaded rod extends to the hole opening of the air hole and is located between the air hole and the ventilation hole, a lower half portion of the air cylinder end cover is further provided with an air path communicated with the air hole, and the air path is communicated with the outside.

8. The pneumatic nailing gun with the adjustable nailing force according to claim 6, wherein the mounting seat is fixedly connected to the air cylinder end cover, the air hole is arranged in the mounting seat, a ventilation hole communicated with the air hole is further arranged in the mounting seat, the ventilation hole is capable of keeping in communication with the outside, the air hole is movably connected with a ventilation column, the ventilation column comprises a ventilation rod, the ventilation rod comprises an air inlet hole and an inner air hole communicated with the air inlet hole, the air inlet hole is communicated with the first air chamber, the ventilation column is connected with the handle, and under the adjustment of the handle, the inner air hole moves in the air hole, and an inner peripheral surface of the air hole and the ventilation hole form a conducting or closing state through the inner air hole.

9. The pneumatic nailing gun with the adjustable nailing force according to claim 8, wherein the air cylinder end cover comprises an inner end cover and an outer end cover, the outer end cover is attached to an outer side surface of the inner end cover to form the above ventilation channel between the inner end cover and the outer end cover, and the air path is arranged below the ventilation channel.

10. The pneumatic nailing gun with the adjustable nailing force according to claim 9, wherein the air path comprises a cylindrical fixed seat arranged on an outer side surface of the inner end cover, the above mounting seat is inserted in the fixed seat and sealed with the fixed seat, a ventilation groove communicated with the above ventilation hole is arranged on the fixed seat, a plurality of ribs are arranged outside the fixed seat on the outer side surface of the inner end cover, a concave cavity is formed between the ribs, a pore communicated with the outside is arranged at an outer edge of the inner end cover, and the ventilation groove, the concave cavity and the pore are communicated with each other.

11. The pneumatic nailing gun with the adjustable nailing force according to claim 10, wherein an inner side surface of the inner end cover is provided with a first convex portion inserted and hermetically connected in the cylinder body of the first cylinder and a second convex portion inserted and hermetically connected in the cylinder body of the second sir cylinder respectively, a first through hole penetrating through the inner end cover is arranged in the first convex portion, a second through hole penetrating through the inner end cover is arranged in the second convex portion, a sealing ring is arranged between the outer end cover and the inner end cover, the sealing ring encloses the first through hole and the second through hole in the sealing ring, and a groove communicating the first through hole with the second through hole is arranged on the outer end cover.

12. The pneumatic nailing gun with the adjustable nailing force according to claim 8, wherein the mounting seat comprises a ventilation ring communicated with the air hole, the ventilation hole is formed in the ventilation ring, the ventilation column comprises a screw, the mounting seat further comprises a threaded hole, the screw is mounted in the threaded hole through a thread, the ventilation column is connected with the handle through a boss, the ventilation column moves in the air hole through relative rotation of the screw and the threaded hole, and the air hole forms a conducting or closing state with the ventilation ring through the inner air hole.

13. The pneumatic nailing gun with the adjustable nailing force according to claim 12, wherein an end portion of the mounting seat is provided with a flange, the fixed seat comprises a mounting groove matched with the flange in shape, the flange is located in the mounting groove, an annular groove is further formed on an outer wall of the mounting seat, and the annular groove is communicated with the above ventilation groove.

14. The pneumatic nailing gun with the adjustable nailing force according to claim 13, wherein the nailing gun further comprises an outer housing, a fixed groove is arranged on the outer housing, a cover plate is mounted on a groove opening of the fixed groove, a movable rod is arranged in the fixed groove, one end of the movable rod is provided with a spring groove for mounting a second spring, the second spring abuts against the air cylinder end cover, the other end of the movable rod is a spherical boss, the handle comprises a connecting rod and a boss turntable connected to an outer end of the connecting rod, the connecting rod is connected with the boss, a spherical groove matched with the spherical boss in shape is formed on the boss turntable, and the spherical boss passes through a U-shaped opening of the fixed groove and abuts against the spherical groove.

15. The pneumatic nailing gun with the adjustable nailing force according to claim 14, wherein a rotating groove with an opening is further arranged on the outer housing, the boss turntable rotates in the rotating groove, numbers corresponding to the spherical groove are further arranged on an end surface of the boss turntable, and the numbers are arranged on a touch table of the boss turntable at intervals.

* * * * *